Patented Aug. 24, 1926.

1,597,576

UNITED STATES PATENT OFFICE.

SYDNEY H. BROOMALL, OF PHILADELPHIA, PENNSYLVANIA, ASSIGNOR TO A. H. REID CREAMERY & DAIRY SUPPLY COMPANY, A CORPORATION OF PENNSYLVANIA.

VALVE MECHANISM.

Application filed December 10, 1925. Serial No. 74,481.

This invention relates to valve mechanisms designed more particularly for use in connection with the inlet and outlet openings through which the milk is respectively introduced and discharged in milk holders employed for the Pasteurization of milk.

The aim of the invention is to prevent the intermixing of the raw and the Pasteurized milk in the event of damage to or leakage past the valves controlling the openings into the milk holding compartment, and to this end the invention consists in a valve seat formed with a cavity or portion adapted to receive any leakage or seepage while the valve is in closed position, and in the combination therewith of means for discharging the fluid from the cavity without passing the same between the valve and its seat.

The improved construction will be described in detail in the specification to follow, and the novel features thereof will be set forth in the appended claims.

In the accompanying drawings:

Fig. 1 is a longitudinal section through my improved valve mechanism showing the main valve in open position, Fig. 2 is a similar view showing the main valve closed.

Fig. 3 is a plan view of the same with certain parts broken away.

Referring to the drawings:

The drawing illustrates the invention in connection with a milk holding tank or compartment such as employed in the Pasteurization of milk, but it will be understood that the invention is not limited to such use, but is applicable also in other connections where it is desirable to prevent the leakage or seepage of fluid between a valve and its seat, from passing through the opening or passage controlled by the valve.

In the drawing, 1 designates a holding tank or compartment containing an inlet opening 2 for the inlet of the raw milk, and an adjacent outlet opening 3 for the discharge of the Pasteurized milk after it has been retained in the tank for the requisite period to effect its Pasteurization. The opening 2 is surrounded by a valve seat 4, and communicates with a pipe 5, which in turn communicates with a pipe 6 for the supply of the raw milk. The outlet opening 3 is similarly surrounded by a similar valve seat 7, not shown, and leads into a pipe 8 communicating with a pipe 8ª through which the Pasteurized milk is discharged. Cooperating with each valve seat is a valve mechanism comprising a main valve 9, and a secondary valve 10, and as these parts are the same for both the inlet and outlet openings, a description of one mechanism will suffice.

The valve seat 4 is formed with a sloping or beveled seating surface 11 adapted to receive a corresponding sloping surface 12 on the body of the main valve, which latter is formed with a guiding extension 13 fitting slidingly in the upper end of the pipe 5, so that when the valve is lowered, the sloping surface thereon will seat against the sloping surface on the valve seat and will close the inlet, and when the valve is raised, the sloping surfaces will separate from each other and the inlet will be opened.

The valve seat is formed between its edges with a circumferentially extending open groove or cavity 14 which is preferably under cut, so that it will receive any fluid leaking between the valve 9 and its seat when the valve is in closed position, and in accordance with my invention means are provided for effecting automatically the discharge of the fluid collecting in the cavity without passing it between the valve and its seat, thereby preventing the intermixture of the Pasteurized milk with the raw milk. The discharge of the fluid accumulating in the cavity is effected through a discharge opening 15 leading from the cavity outwardly through the valve seat, which opening is surrounded by a valve seat 15ª, and which opening is controlled by a needle valve 16 on the upper end of a valve stem 17 extending downwardly within a casing or tube 18 embedded in the bottom of the tank or compartment 1 and extending through the same to the outside. At its lower end the stem 17 slides through a perforated guide plate 19 fixed in the lower end of the tube, and is surrounded by a spiral spring 20 bearing at its lower end against the guide plate and at its upper end against a washer 21 fixed to the valve stem, the tendency of the spring being to thrust the stem upwardly and hold the needle valve to its seat and thereby close the discharge opening 15. The end of the needle valve, when in this closed position, projects upwardly slightly beyond the sloping valve seat surface 4 when the main valve is in open position as shown in Fig. 1, so that when the main valve is lowered to close the inlet opening, the sloping surface on the main valve will engage the projecting end of the needle valve and will thrust the same back against the force of the spring, and thereby automatically open the discharge opening 15. The needle valve being thus held in open position while the main valve is closed, any fluid escaping past the valve from the tank will be received in the cavity 14 and will be discharged therefrom outwardly through the tube 18 and perforations in the guide plate 19 to the outside, thereby avoiding any intermixture of the Pasteurized milk with the raw milk entering the pipe 5.

In the foregoing description and accompanying drawing, I have set forth my invention in the particular detailed form which I prefer to adopt. It will be manifest however that these details may be variously changed and modified by the skilled mechanic without departing from the spirit of the invention, and it will be understood that the invention is not limited to any particular form or construction of the parts, except in so far as such limitations are specified in the claims.

Having thus described my invention, what I claim is:

1. In combination with a receptacle formed with an opening for the passage of liquid, a valve seat surrounding said opening, a main valve adapted to said seat, said valve seat being formed with an open cavity to receive leakage, and said cavity being provided with a discharge opening, a secondary valve for controlling said discharge opening and in position to be engaged and opened by the main valve when the latter is closed, and means for closing the secondary valve when the main valve is opened.

2. In combination with a receptacle formed with an opening for the passage of liquid, a valve seat surrounding said opening, a main valve adapted to said seat, said valve seat being formed between its edges with an open cavity to receive leakage, and said cavity being formed with a discharge opening, and a secondary valve spring-pressed against its seat to close said discharge opening when the main valve is in open position, said secondary valve when in closed position projecting beyond the surface of the valve seat of the main valve; whereby when the main valve is closed it will engage the projecting end of the secondary valve and automatically open the same and discharge the leakage.

3. In combination with a receptacle formed with an opening for the passage of liquid, a valve seat surrounding said opening, a main valve adapted to said seat, said valve seat being formed between its edges with a circumferentially extending open cavity to receive liquid leaking between the main valve and its seat, and said cavity being provided with an opening for the discharge of the leakage, a tube leading from the discharge opening to receive the liquid therefrom, a secondary valve within said tube in position to control said discharge opening, a stem fixed to the secondary valve and guided in the tube, and a spring acting on the stem and operating to hold the secondary valve yieldingly in closed position with its end projecting beyond the surface of the seat of the main valve; whereby when the main valve is in open position the secondary valve will be closed, and when the main valve is closed it will engage and automatically open the secondary valve.

In testimony whereof, I have affixed my signature hereto.

SYDNEY H. BROOMALL.